United States Patent [19]
Oder et al.

[11] Patent Number: 6,116,210
[45] Date of Patent: Sep. 12, 2000

[54] SYSTEM FOR OPERATING AN INTERNAL COMBUSTION ENGINE IN A MOTOR VEHICLE IN PARTICULAR

[75] Inventors: Michael Oder, Korntal-Muenchingen; Uwe Maienberg, Stuttgart; Klaus Scherrbacher, Schwieberdingen, all of Germany

[73] Assignee: Robert Bosch GmbH, Stuttgart, Germany

[21] Appl. No.: 09/254,390
[22] PCT Filed: Jun. 29, 1998
[86] PCT No.: PCT/DE98/01776
§ 371 Date: Apr. 29, 1999
§ 102(e) Date: Apr. 29, 1999
[87] PCT Pub. No.: WO99/01654
PCT Pub. Date: Jan. 14, 1999

[30] Foreign Application Priority Data

Jul. 2, 1997 [DE] Germany ............... 197 28 112

[51] Int. Cl.$^7$ ............... F02B 17/00; F02D 41/34
[52] U.S. Cl. ............... 123/305; 123/480; 123/435; 123/295
[58] Field of Search ............... 123/305, 295, 123/435, 436, 480, 399, 403, 430

[56] References Cited

U.S. PATENT DOCUMENTS

| | | | |
|---|---|---|---|
| 5,072,712 | 12/1991 | Steinbrenner et al. | 123/677 |
| 5,095,874 | 3/1992 | Schnaibel et al. | 123/361 |
| 5,282,449 | 2/1994 | Shinsuke et al. | 123/480 |
| 5,483,934 | 1/1996 | Heinz | 123/305 |
| 5,704,339 | 1/1998 | Choe et al. | 123/674 |
| 5,746,176 | 5/1998 | Damson et al. | 123/336 |
| 5,746,183 | 5/1998 | Parke et al. | 123/492 |
| 5,755,198 | 5/1998 | Grob et al. | 123/295 |

FOREIGN PATENT DOCUMENTS

| | | |
|---|---|---|
| 0 539 921 | 5/1993 | European Pat. Off. . |
| 2 717 227 | 9/1995 | France . |
| 1-104934 | 4/1989 | Japan . |
| 7-269402 | 10/1995 | Japan . |
| 8-312401 | 11/1996 | Japan . |
| 10-9032 | 1/1998 | Japan . |

*Primary Examiner*—Henry C. Yuen
*Assistant Examiner*—Hieu T. Vo
*Attorney, Agent, or Firm*—Kenyon & Kenyon

[57] ABSTRACT

An internal combustion engine for a motor vehicle in particular is described, provided with an injection valve for injecting fuel directly into a combustion chamber either during an intake phase in a first operating mode or during a compression phase in a second operating mode. In addition, a control unit is also provided for controlling and/or regulating a fuel mass injected into the combustion chamber differently in the two operating modes. The control unit is designed so that a required air mass can be determined from a torque demand in the first operating mode, and then the fuel mass to be injected can be determined from the required air mass, and in the second operating mode the fuel mass injected can be determined directly from the torque demand.

14 Claims, 2 Drawing Sheets

SYSTEM FOR OPERATING AN INTERNAL COMBUSTION ENGINE IN A MOTOR VEHICLE IN PARTICULAR

FIELD OF THE INVENTION

The present invention relates to a method of operating an internal combustion engine in a motor vehicle in particular, where fuel is injected directly into a combustion chamber either during an intake phase in a first operating mode or during a compression phase in a second operating mode, and where the fuel mass to be injected into the combustion chamber is controlled and/or regulated differently in the two operating modes. In addition, the present invention concerns an internal combustion engine for a motor vehicle in particular, having an injection valve with which fuel can be injected directly into a combustion chamber either during an intake phase in a first operating mode or during a compression phase in a second operating mode and having a control unit for different control and/or regulation of the fuel mass to be injected into the combustion chamber in the two operating modes.

BACKGROUND INFORMATION

Systems for direct injection of fuel into the combustion chamber of an internal combustion engine are known in general. A distinction is made between homogeneous operation as the first operating mode and stratified charge operation as the second operating mode. Stratified charge operation is used in particular at low loads applied to the internal combustion engine, while homogeneous operation is used at higher loads. In stratified charge operation, fuel is injected into the combustion chamber during the compression phase of the combustion engine, specifically, it is injected into the immediate vicinity of a spark plug. Consequently, there no longer is a uniform distribution of fuel in the combustion chamber, but instead the fuel is immediately ignited by the spark plug. The advantage of stratified charge operation is that smaller loads can be handled by the engine with a much smaller fuel mass. However, higher loads cannot be handled by stratified charge operation. In the homogeneous operating mode provided for such higher loads, fuel is injected during the intake phase of the combustion engine, so that turbulence can be created in the fuel to ensure a good distribution of fuel in the combustion chamber. To this extent, homogeneous operation corresponds approximately to the operating mode of internal combustion engines wherein fuel is injected into an intake manifold leading to the combustion chamber in the traditional manner.

In both operating modes, i.e. in stratified charge operation and in homogeneous operation, the amount of fuel injected is controlled and/or regulated as a function of multiple input parameters to optimize fuel savings, reduce exhaust, etc. The control and/or regulation is different in the two operating modes.

SUMMARY OF THE INVENTION

An object of the present invention is to create an improved method of control and/or regulation in the two operating modes of an internal combustion engine.

This object is achieved according to the present invention with a method and an internal combustion engine which determines a required air mass from a required torque in the first operating mode and determines the fuel mass to be injected from the required air mass, and determines, from the required torque, the fuel mass to be injected directly in the second operating mode.

The control and/or regulation of the fuel mass to be injected is thus air-based in homogeneous operation. First, the required air mass is determined and then the fuel mass to be injected is determined from this. To this extent, control and/or regulation in homogeneous operation corresponds approximately to control and/or regulation in known internal combustion engines where fuel is injected into an intake manifold leading to the combustion chamber in a conventional manner. This yields the important advantage that the control and/or regulation used with conventional combustion engines can also be used at least in part for homogeneous operation with the method and the internal combustion engine of the present invention. The existing programs for a control unit carrying out the control and/or regulation and in particular, the available know-how can may be used from the known combustion engines, and thus need not be developed as new programs and hardware.

In stratified charge operation, the fuel mass to be injected is determined directly as a function of the required torque. This is a simple and quick but nevertheless extremely effective method of determining fuel mass. This method is based on a finding that the torque generated by the combustion engine in stratified charge operation depends on the fuel mass injected, while the required air mass and/or required firing angle of a spark plug arranged in the combustion chamber are of only subordinate importance for the torque generated, as long as they meet certain boundary conditions.

The direct determination of the fuel mass to be injected from the required torque according to the present invention can be performed very quickly, as mentioned above, which offers the advantage that no excess torque or the like need be kept in reserve, as may be the case in homogeneous operation, for example, but instead the fuel mass can be calculated accurately directly before injection. This permits additional fuel savings and a further improvement in smooth running of the internal combustion engine.

The method according to the present invention for operating an internal combustion engine in the two operating modes of homogeneous operation and stratified charge operation has a simple and clear design, while still guaranteeing in both operating modes that the torque required by the driver of the motor vehicle, for example, will be made available rapidly and accurately and in particular with a minimum of fuel consumed and exhaust gas produced.

In an advantageous embodiment of the present invention, the required air mass is determined in the second operating mode as a function of the operating parameters of the combustion engine. The above-mentioned boundary conditions for the required air mass are satisfied in this way. This guarantees that even in stratified charge operation, where air mass plays a minor role in the generated torque of the internal combustion engine, and where the air mass therefore would not have to be controlled and/or regulated, air is nevertheless supplied to the combustion chamber in precisely the amount required on the basis of the operating parameters of the combustion engine.

In an advantageous refinement of the present invention, the required air mass is determined as a function of exhaust gas recirculation and/or tank venting and/or brake booster and/or noise production and/or the like.

With regard to exhaust gas recirculation, pressure ratios permit exhaust gas recirculation as a result of the influence on the air mass supplied. In particular, air is supplied in precisely an amount such that the pressure upstream from the combustion chamber in the direction of flow will be lower than the pressure downstream from the combustion chamber, so that exhaust gas will be drawn into the combustion chamber and thus recirculated.

The same thing is also true with regard to tank venting. By influencing the air mass supplied, the pressure ratios in a fuel tank are precisely such that vaporized fuel is drawn into the combustion chamber and thus the fuel tank is vented.

With regard to the brake booster, the choice of air mass supplied achieves the result that a brake booster operated at a reduced pressure from the intake manifold is supplied with a sufficient pressure for braking under all conditions. Thus, precisely enough air is supplied through the intake manifold into the combustion chamber so that a required vacuum in the brake booster is guaranteed.

With regard to noise produced by the combustion engine, it has been found that in stratified charge operation, this depends on the air mass supplied, among other things. Therefore, the air supplied is influenced in such a way as to yield the lowest possible noise level.

In another advantageous refinement of the present invention, a maximum allowed pressure ratio is predetermined for exhaust gas recirculation and/or tank venting and/or the brake booster and/or noise production, and the smallest of the maximum allowed pressure ratios is used as the basis for determining the air mass required.

In all the above mentioned functions, the result achieved due to the respective maximum allowed pressure is that the respective function can be carried out reliably. In exhaust gas recirculation and in tank venting, this means that at the respective maximum allowed pressure, exhaust gas or vaporized fuel will be drawn into the combustion chamber in each case. With the brake booster, this means that at the respective maximum allowed pressure, the brake booster will operate reliably in each case. And in noise production, this means that the noise level will not be perceived as disturbing at the respective maximum allowed pressure.

Then the lowest pressure is selected from these maximum allowed pressures; in other words, a minimum selection is made. This lowest pressure then guarantees that all the aforementioned functions will be operational simultaneously at all times.

It is especially expedient if the least of the maximum allowed pressure ratios is linked to an actual ambient pressure. The lowest of the maximum allowed pressures in the intake manifold of the combustion engine is thus converted to a required air mass. The same control or regulation for the throttle valve can thus be used by a simple switch between homogeneous operation and stratified charge operation.

In addition, it is especially expedient if the maximum allowed pressure ratio for the brake booster and/or for noise production is determined from an engine characteristic map which depends on the rotational speed of the combustion engine in particular. In this engine characteristic map the vacuum required for the brake booster on the one hand and the noise production which depends on the rotational speed of the engine on the other hand can be taken into account in an especially simple manner.

In another advantageous embodiment of the present invention, the start of injection and/or the end of injection of an injection valve that injects fuel into the combustion chamber is coordinated with the firing angle of a spark plug igniting the fuel in the combustion chamber. It is thus possible for the start of injection to be used to control the firing angle or for the firing angle to be used to control the start of injection. In stratified charge operation, it is essential for the two operating parameters of the combustion engine to be considered in pairs according to the present invention and, if required, also varied in pairs.

Implementation of the method according to the present invention in the form of an electrical storage medium provided for a control unit of an internal combustion engine in a motor vehicle, in particular, is of special importance. A program that can be run on a computer device, in particular a microprocessor, and is suitable for executing the method according to the present invention is stored on the electrical storage medium. In this case the present invention is implemented by a program stored on the electrical storage medium.

Additional features, possible applications and advantages of the present invention are derived from the following description of embodiments of the present invention which are illustrated in the figures. All the features described or illustrated here, either alone or in any combination, constitute the object of the present invention, regardless of how they are combined in the patent claims or how they are referred back to, and regardless of their formulation or presentation in the specification and drawings.

DETAILED DESCRIPTION

Figure 1:
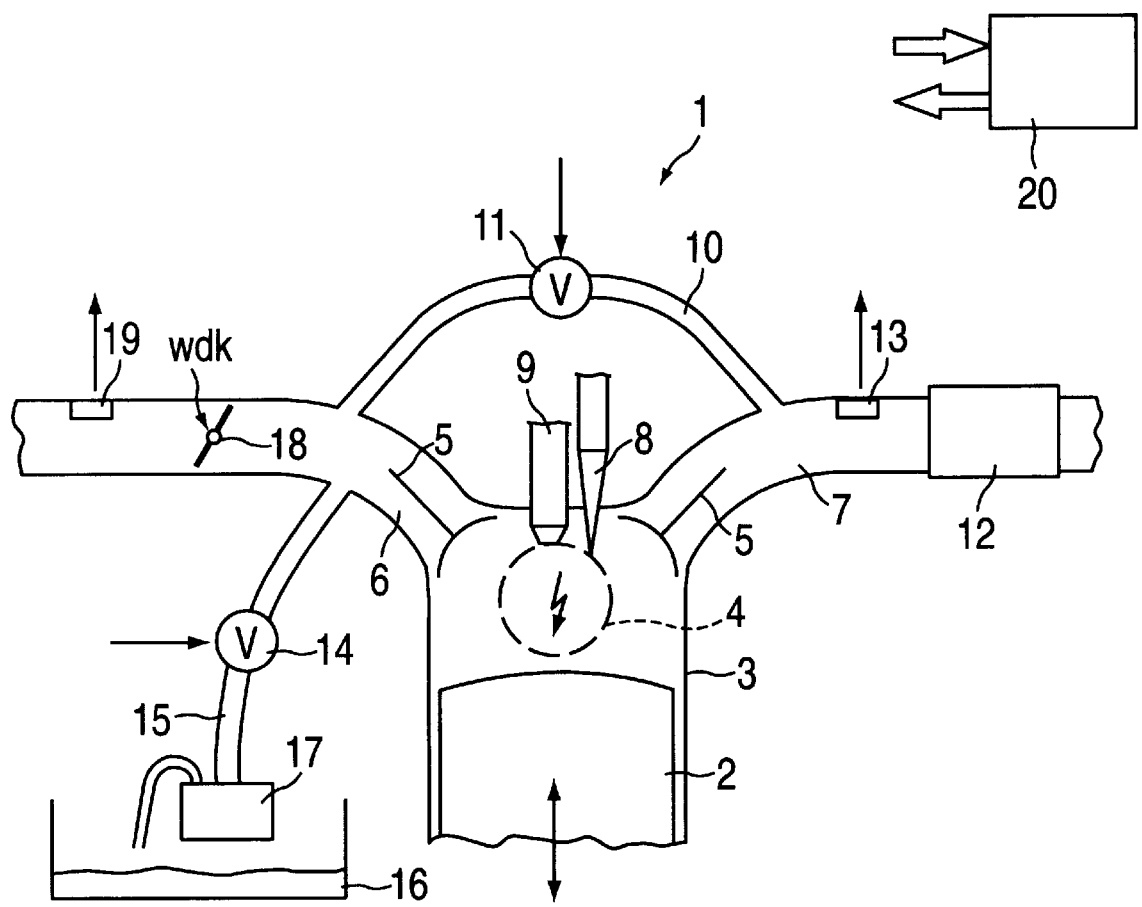
FIG. 1 shows a schematic block diagram of one embodiment of a system according to the present invention for operating an internal combustion engine of a motor vehicle.

FIG. 1 shows an internal combustion engine 1, where a piston 2 can move back and forth in a cylinder 3. Cylinder 3 is provided with a combustion chamber 4 connected to an intake manifold 6 and a exhaust pipe 7 through valves 5. Additionally, an injection valve 8 and a spark plug 9 are provided for combustion chamber 4. Exhaust pipe 7 is connected to intake manifold 6 by an exhaust gas recirculation line 10 and a controllable exhaust gas recirculation valve 11. In addition, a catalyst 12 with a lambda sensor 13 upstream from it are connected to exhaust gas tube 7. A tank venting line 15 having a controllable tank venting valve 14 leads to intake manifold 6 and is also connected to an activated carbon filter 17, which is supplied from a fuel tank 16. In addition, a controllable throttle valve 18 and a pressure sensor 19 are accommodated in intake manifold 6.

In a first operating mode, i.e., homogeneous operation of internal combustion engine 1, fuel is injected by injection valve 8 into combustion chamber 4 during an intake phase produced by piston 2. Due to the simultaneous air intake, turbulence is produced in the injected fuel, which is thus distributed essentially uniformly in combustion chamber 4. Then the fuel-air mixture is compressed during the compression phase and ignited by spark plug 9. Piston 2 is driven by the expansion of the ignited fuel.

In a second operating mode, stratified charge operation of internal combustion engine 1, fuel is injected by injection valve 8 into combustion chamber 4 during a compression phase produced by piston 2, namely it is injected locally into the immediate vicinity of spark plug 9 and directly before the top dead center of piston 2. Then with the help of spark plug 9, the fuel is ignited so that piston 2 is driven by the expansion of the ignited fuel in the following working phase.

The fuel mass injected by injection valve 8 into combustion chamber 4 in stratified charge operation and in homogeneous operation is controlled and/or regulated by control unit 20 with respect to low fuel consumption and/or low exhaust gas production. Therefore, control unit 20 has a microprocessor with a program stored in a storage medium, in particular in a read only memory, said program being suitable for carrying out the aforementioned control and/or regulation. Control unit 20 receives input signals representing operating parameters of the combustion engine measured by sensors. For example, control unit 20 is connected to lambda sensor 13 and/or pressure sensor 19. Control unit 20 produces output signals for influencing the performance of the combustion engine according to the desired control and/or regulation by actuators. For example, control unit 20 is connected to injection valve 8, spark plug 9, exhaust gas recirculation valve 11, tank venting valve 14 and/or throttle valve 18.

Figure 3:
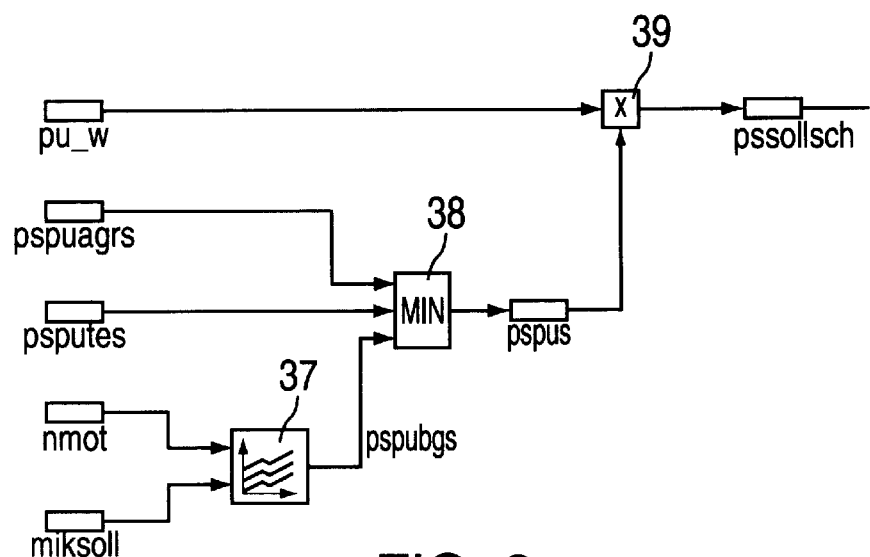
FIG. 3 shows an expanded schematic of the control and/or regulation operating parameters shown in FIG. 2.
Figure 2:
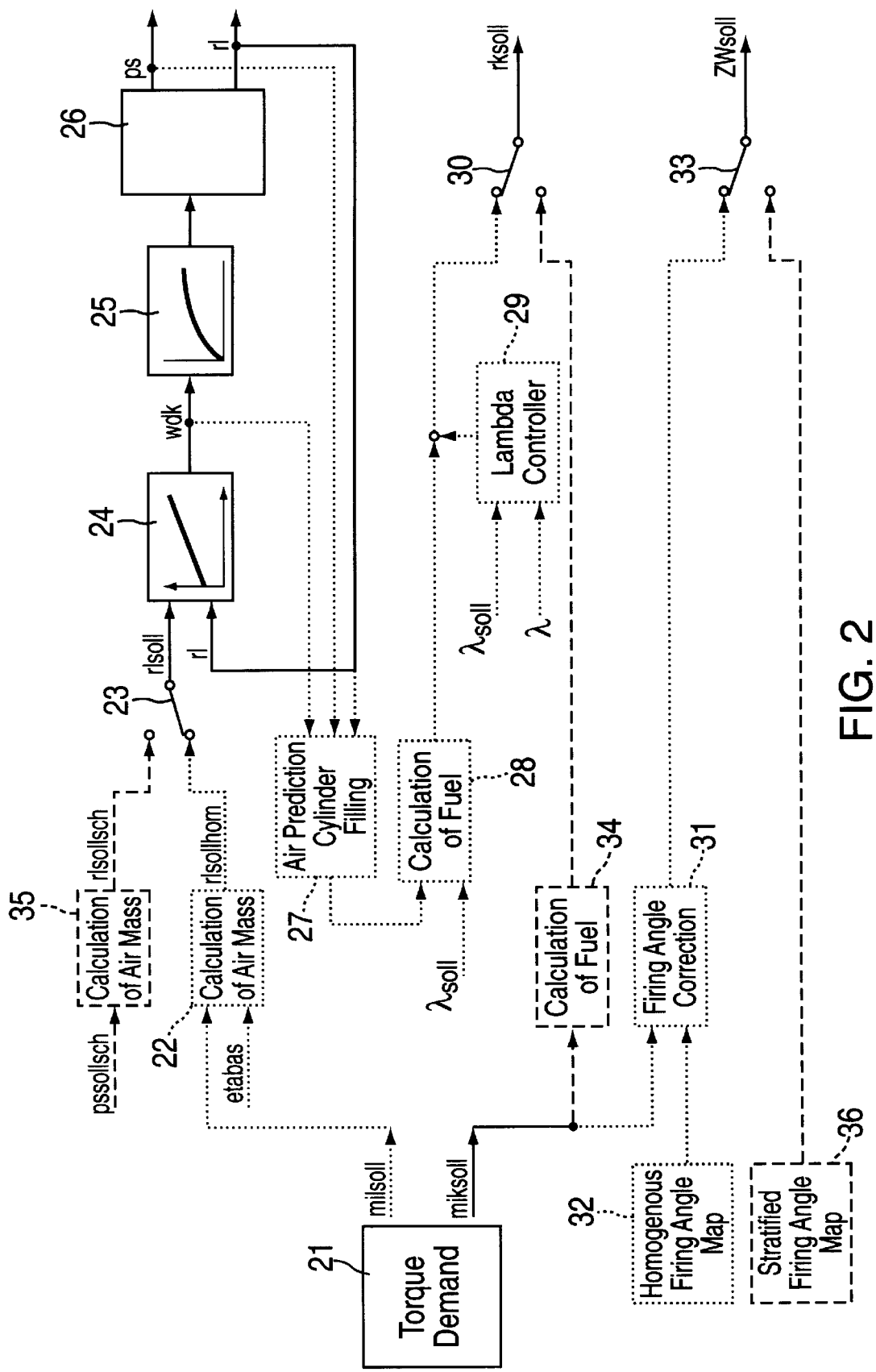
FIG. 2 shows a schematic block diagram of control and/or regulation operating parameters of the system shown in FIG. 1.

FIGS. 2 and 3 illustrate the method by which stratified charge operation and homogeneous operation of internal combustion engine 1 are controlled by control unit 20. Solid lines denote both modes of operation, i.e., homogeneous operation and stratified charge operation, while dotted lines denote only homogeneous operation and dashed lines denote only stratified charge operation.

A torque demand 21 produces a long-term torque demand milsoll and a short-term torque demand miksoll based on the position of the gas pedal, i.e. the driver's intent, and optionally also based on other motor vehicle requirements.

In homogeneous operation, the air mass necessary to produce this torque demand is calculated from long-term torque demand milsoll and a signal etabas in a block 22. The efficiency of combustion engine 1 is taken into account through signal etabas, e.g., the efficiency at a certain firing angle or at a certain lambda value.

Signal rlsollhom produced by block 22 is sent via a switch 23 to a control circuit which is used to regulate the position of throttle valve 18. In homogeneous operation, signal rlsoll corresponds to signal rlsollhom and is the setpoint of the required air mass supplied to a throttle valve regulator 24 to which a signal rl is also sent as the actual value of the required air mass. Signal wdk goes to throttle valve 18 and represents the angle of throttle valve 18 to be set.

Above-mentioned signal rl for the actual value of the required air mass is determined by an electronic gas pedal 25 and subsequent charge detection 26, while on the other hand a signal ps corresponding to the pressure in intake manifold 6 is also determined. Signal ps can be calculated with the help of pressure sensor 19 or other operating parameters of internal combustion engine 1.

Then in block 27 an air prediction for the cylinder charge is performed on the basis of signals wdk and ps for the position of throttle valve 18 and the pressure in intake manifold 6 and from the actual value for required air mass rl and optionally from other operating parameters of internal combustion engine 1. This means that the air mass present in cylinder 3 at the time of combustion is calculated in advance.

The fuel mass for a given lambda setpoint $\lambda_{soll}$ is calculated in a block 28 on the basis of the air mass thus determined. Then the fuel mass is regulated with a downstream lambda control 29 so that actual lambda value $\lambda$ measured by lambda sensor 13 corresponds to lambda setpoint $\lambda_{soll}$. As a result, a signal rksoll corresponding to the fuel mass to be injected is relayed over a switch 30. Then injection valve 8 is activated on the basis of this signal.

In addition, a firing angle correction 31 maintains the short-term torque demand miksoll and the signal from a firing angle map 32 in homogeneous operation. Firing angle ZWsoll is calculated from these signals and relayed via a switch 33 with spark plug 9 controlled by signal ZWsoll.

It is possible here for an excess torque predetermined by fuel mass rksoll to be injected to be reduced again by a corresponding adjustment of firing angle ZWsoll to compensate for deviations in long-term torque demand and short-term torque demand by a firing angle correction 31.

In stratified charge operation, switches 23, 30 and 33 are each in the other position. Switches 30 and 33 are controlled in synchronization, while switch 23 is switched in advance.

As a result, fuel mass rksoll to be injected is calculated by block 34 as a function of short-term torque demand miksoll. This calculation can be performed directly before the actual injection. For this reason, this calculation may be based on short-term torque demand miksoll, representing the total torque. Therefore, in stratified charge operation it is not necessary to produce an excess torque with which deviations in the long-term and short-term torque demand could be compensated.

In addition, a block 35 with which the required air mass is calculated from operating parameters of engine 1 is provided for stratified charge operation. This block 35 receives an input signal pssollsch, which will be discussed in greater detail below, and it also produces an output signal rlsollsch which goes as signal rlsoll via switch 23 to the control circuit for throttle valve 18 and ultimately determines signal wdk for the position of throttle valve 18.

Lambda control 29 in particular is not effective in stratified charge operation due to switch 30, which has been changed A firing angle map 36 for stratified charge operation calculates firing angle ZWsoll with which spark plug 9 is controlled. Firing angle ZWsoll and the start of injection and the end of injection of fuel mass rksoll to be injected depend on one another. Thus, the two operating parameters are influenced in pairs. Therefore, the firing angle is coordinated with the injection.

With the help of signal pssollsch, throttle valve 18 is set at a certain position in stratified charge operation, to supply a certain air mass rlsollsch or rlsoll to combustion chamber 4 of engine 1. Production of signal pssollsch is illustrated in FIG. 2.

In order for exhaust gas to be recirculated from exhaust pipe 7 to intake manifold 6 with exhaust gas recirculation valve 11 open, the pressure in intake manifold 6 must be lower than that in exhaust pipe 7. This is achieved by presetting a maximum allowed pressure ratio pspuagrs for intake manifold 6 at which this will definitely be the case.

In order for vaporized fuel to be vented from activated carbon filter 17 into intake manifold 6 with tank venting valve 14 open, the pressure in intake manifold 6 must be lower than that in activated carbon filter 17. This is achieved by presetting a maximum allowed pressure ratio psputes for intake manifold 6 at which this will definitely be the case.

In order for a brake booster, which is connected to intake manifold 6 in a manner not shown here and from which it obtains the vacuum necessary for its operation, to be functional in all cases, a certain vacuum must always prevail in intake manifold 6. This is achieved by presetting a maximum allowed pressure for the intake manifold at which this will always be the case.

In order for combustion engine 1 to have the lowest possible noise production, it has been found that this can be influenced by the air mass supplied and thus by the pressure in intake manifold 6.

The last two possible influences mentioned with regard to the brake booster and noise production are achieved with the help of an engine characteristic map 37 to which rotational speed nmot of engine 1 and torque demand miksoll are sent. Engine characteristic map 37 generates from this information an output signal pspubgs which takes into account the requirements of the brake booster and of noise production.

Signals pspuagrs, psputes and pspubgs are sent to a minimum selector 38, which selects the smallest pressure ratio from these maximum allowed pressure ratios. This guarantees that each of the functions described here, i.e., exhaust gas recirculation, tank venting, brake booster and noise production, will be provided with the maximum allowed pressure in each case and will thus be fully functional.

The selected lowest pressure is relayed as signal pspus to a gate 39 which links signal pspus to the ambient pressure or to the pressure upstream from throttle valve $pu_{13}$ w. By this gate 39, signal pssollsch is generated and is sent to block 35 of FIG. 1 for calculation of the required air mass rlsollsch or rlsoll.

What is claimed is:

1. An internal combustion engine for a motor vehicle, comprising:
    an injection valve for injecting a fuel mass directly into a combustion chamber during one of an intake phase in a first operating mode and a compression phase in a second operating mode;
    a control unit for at least one of controlling and regulating the fuel mass to be injected into the combustion chamber, the control unit determining the fuel mass in the first operating mode from a required air mass, the required air mass being determined from a torque demand, the control unit determining the fuel mass in the second operating mode directly from the torque demand.

2. The internal combustion engine according to claim 1, further comprising:
    an intake manifold leading to the combustion chamber, the intake manifold including a pressure sensor and a throttle valve.

3. The internal combustion engine according to claim 1, further comprising:
    a spark plug for the combustion chamber.

4. A device for a control unit of an internal combustion engine in a motor vehicle, comprising:
    an electrical storage medium, the electrical storage medium including a read-only memory and storing a program executable by a microprocessor, the program performing the following steps:
       in a first operating mode, determining a required air mass from a torque demand; and
       in the first operating mode, determining a fuel mass from the required air mass;
       in a second operating mode, determining the fuel mass directly from the torque demand; and
       injecting the fuel mass directly into a combustion chamber during one of an intake phase in the first operating mode and a compression phase in the second operating mode, the fuel mass being regulated differently in the first operating mode as compared to the second operating mode.

5. A method of operating an internal combustion engine in a motor vehicle, comprising the steps of:
    in a first operating mode, determining a required air mass from a torque demand;
    in the first operating mode, determining a fuel mass from the required air mass;
    in a second operating mode, determining the fuel mass directly from the torque demand; and
    injecting the fuel mass directly into a combustion chamber during one of an intake phase in the first operating mode and a compression phase in the second operating mode, the fuel mass being regulated differently in the first operating mode as compared to the second operating mode.

6. The method according to claim 5, further comprising the step of:
    in the second operating mode, determining the required air mass as a function of operating parameters of the internal combustion engine.

7. The method according to claim 6, further comprising the step of:
    in the second operating mode, determining the required air mass as a function of at least one of exhaust gas recirculation, tank venting, a brake booster and noise production.

8. The method according to claim 7, further comprising the steps of:
    presetting a maximum allowed pressure ratio for the at least one of exhaust gas recirculation, tank venting, the brake booster, and the noise production
    determining the required air mass from a smallest of the maximum allowed pressure ratio preset for the at least one of exhaust gas recirculation, tank venting, the brake booster, and the noise production.

9. The method according to claim 8, further comprising the step of:
    linking the smallest of the maximum allowed pressure ratio to an actual ambient pressure.

10. The method according to claim 8, further comprising the step of:
    determining the maximum allowed pressure ratio for at least one of the brake booster and the noise production as a function of an engine characteristic map, the engine characteristic map being a function of a rotational speed of the internal combustion engine.

11. The method according to claim 6, further comprising the step of:
    setting the required air mass using a throttle valve.

12. The method according to claim 5, further comprising the step of:
    coordinating at least one of a start of injection and an end of injection by an injection valve with a firing angle of a spark plug, the injection valve injecting the fuel mass into the combustion chamber, the spark plug igniting the fuel mass in the combustion chamber.

13. The method according to claim 5, further comprising the step of:
    regulating an actual air mass to the required air mass.

14. The method according to claim 5, further comprising the step of:
    performing a lambda control in the first operating mode.

* * * * *